Figure 1:
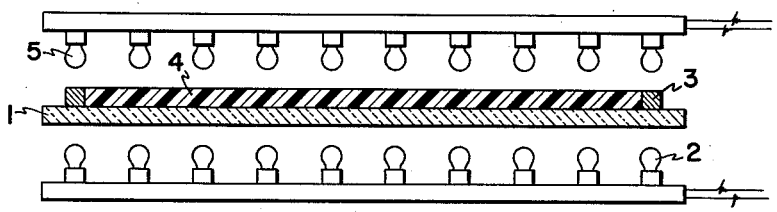

July 31, 1962  L. GRUNIN  3,046,610
PROCESS FOR PREPARING SYNTHETIC PEARLESCENT
RESIN WITH FIXED PATTERNS
Filed Aug. 12, 1960

3,046,610
PROCESS FOR PREPARING SYNTHETIC PEARLESCENT RESIN WITH FIXED PATTERNS
Louis Grunin, 1 Trinity Ave., Spring Valley, N.Y.
Filed Aug. 12, 1960, Ser. No. 49,181
5 Claims. (Cl. 18—58)

This invention relates to the preparation of cast synthetic pearlescent plastic sheets having a fixed design. More particularly, it relates to a process of this nature utilizing ultra violet light.

For many uses, synthetic pearlescent plastic sheets achieve a considerable degree of sales appeal as a result of their decorative appearance. Plastic manufacturers are therefore constantly striving for new aesthetic effects and means for producing the same. These improved aesthetic effects combined with desirable physical properties open the field of use of these materials tremendously, e.g., bathroom tiles, floor and wall materials, and particularly table tops.

The heating of liquid pearlescent resins in an attempt to polymerize the mixture and fix any design contained in the sheet is subject to the difficulty that the crystals responsible for the patterns flow during the treatment, i.e., due to thermal turbulence developed their orientation is not fixed. The desired design is thus adversely affected or lost.

This invention provides an improved method for overcoming these difficulties in preparing cast synthetic pearlescent resin sheets whereby a design is introduced into the liquid resin and then treating the designed liquid pearlescent resin sheet with ultra violet light until a sheet having a fixed lamellae crystal orientation is obtained. The polymer sheet can then be completely cured by heat or further ultra violet exposure without affecting the pearl pattern. Further details follow.

The term "pearlescent" is used herein as a generic term to cover the several recognized varieties of sheen forming an integral feature of the body and substance of a material, as opposed to effects dependent upon the character or treatment of its surface, this sheen being due in its effect to a more or less ordered and systematic orientation within the material of lamellae crystals (flat plates, crystals, and the like) of substances capable of reflecting light. As regards appearance, the term thus includes the various types of sheen commonly designated, in the plastics industry, by the terms integral, pearly, nacreous, silky, metallic, chatoyant and pearlescent.

The retention of the desired design in the pearlescent resin sheet is thus dependent on a fixed lamellae crystal orientation therein. This is obtained in this invention as the liquid resin is converted into a more viscous state, i.e., a firm gel or solid, by the ultra violet treatment. This should be distinguished from the use of ultraviolet to create oriented nacreous effects. The firm gel or solid sheet can then be subjected to heat as in an oven to complete the cure of the polymer. While ultra violet light can be used alone, it brings about a much slower cure of the polymer.

The resin materials employed include any material or mixtures of materials that can be polymerized with ultra violet light with or without the use of suitable catalysts. Some examples of these materials are: polyester resins, a name familiar to those skilled in the art and referring to a material comprising a cross-linking vinyl monomer and an unsaturated polyester or alkyd formed by condensing and esterifying a polyhydric alcohol and a polycarboxylic acid. Various materials containing ethylenic linkages such as divinyl benzene, diallyl phthalate, diallyl malonate, allyl methacrylate, diallyl carbonate, triallyl cyanurate, tetrallyl silane, or copolymers of these materials can be utilized. Mono ethylenic materials such as methyl methacrylate, styrene, etc. can also be used. These materials themselves are not the essence of this invention and are described merely for convenience.

The liquid pearlized resin is poured onto a glass plate or other suitable material that allows the transmission of ultra violet light. The desired design can be introduced into the liquid by: (1) varying the pouring technique when putting the resin on the glass, (2) extruding the resin through a nozzle, which can have various shapes and patterns, and (3) mechanical agitation such as combing or brushing the resin onto the glass. The resin may or may not contain an ultra violet light catalyst since most of the indicated resins will set up under ultra violet light without a catalyst. However, it is generally recognized that a catalyst will accelerate the polymerization and is desirable. Catalysts when used are employed in an amount from about 0.01 to 2 weight percent based on liquid resin. Typical catalysts are benzoin, methyl ethyl ketone peroxide and acetyl peroxide.

It is important to repeat that the design is introduced into the cast sheet while the resin is still liquid by a controlled physical method and that the ultra violet light is used merely as a method of increasing the resin viscosity to fix the design. This method is superior to conventional methods (such as heating to solidify the resin) because the setting up of the resin is done at room temperatures so that the resin viscosity does not decrease with the subsequent distortion and/or disappearance of the design. The rate at which the resin gels and the viscosity of the material used determines how well the design remains in the sheet after it has been introduced into the liquid. In general, it may be stated that a liquid resin having a viscosity range from 5 to 2000 poises at room temperature may be used but this does not exclude the use of materials outside of this range. In general, the faster a material gels under the influence of ultra violet light, the lower the viscosity of the resin that may be used and still maintain the design. The variables determining the rate at which the resin gels are: (1) the concentration of the catalyst-promoter system, (2) the intensity of the ultra violet source and its distance from the material, and (3) the ability of the substrate to transmit ultra violet light.

The liquid resin is introduced onto the glass plate which sets over the ultra violet lights as shown in the drawing by any of the methods previously indicated. The lights are on while the liquid is being introduced onto the glass. The sheets may be cast in a range of thickness from $\frac{1}{16}$ of an inch to 1 inch depending upon the size of the gasket used and the quantity of liquid poured into the mold. After the sheet has been cast a set of lights is lowered over the sheet as shown in the drawing to help speed up the complete gel of the sheet.

The length of time to which the sheet is exposed to the ultra violet light will vary with the factors mentioned above (namely catalyst, light intensity, thickness of the sheet, etc.) but in general it can be stated that exposure times from about ½ to 3 hours are necessary to prepare a proper sheet.

After the resin has been set under the ultra violet lights it is only then possible to remove the sheet and place it in an oven and by applying heat to the sheet accelerate its final cure. This is not necessary, however, since the sheet will set up under the ultra violet lights if given enough time. If an oven is used, temperature/time cycles may be used which are well known to those skilled in the art of casting, e.g., about 150°–300° F. for at least 15 minutes.

The ultra violet exposure time is normally inclusive of where no addition heat curing is used. The ultra violet frequency within the normal range is not critical. A typical ultra violet source is the General Electric Black Light fluorescent tube. Exposure of one sheet surface, e.g., the lower, is adequate.

Various dyestuffs, pigments, plasticizers, lubricants, and other modifiers may be incorporated to obtain certain desired characteristics in the finished product, according to well-known practices in the art.

Figure 2:
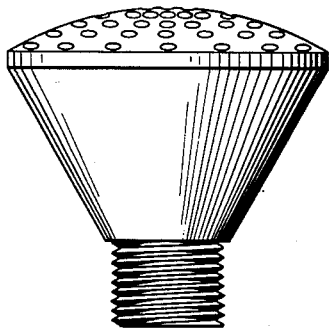

FIG. 1 is a sectional view of an apparatus that can be used in the process of this invention and FIG. 2 is a sectional view of a wing tip nozzle for extrusion of the liquid resin.

Referring to FIG. 1, 1 is the glass plate upon which the liquid resin material is applied, 2 is the lower bank of ultra violet lights, 3 is the gasket to control the thickness of the sheets, 4 is the actual sheet with the pattern, and 5 is a bank of upper lights.

This invention and its advantages will be better understood with reference to the following examples.

*Example 1*

The following resin mix was prepared:

| | Parts |
|---|---|
| Laminac 4123 [1] | 100 |
| Nacromer XPE [2] | 2 |
| Benzoyl peroxide | 0.5 |
| Benzoin | .2 |

[1] Polyester resin from American Cyanamid.
[2] Pearlescent pigment—Mearl Corp.

The material is forced through a wing tip nozzle (see FIG. 2) and extruded onto a horizontal glass plate in a V design, obtained by controlled pouring, with the lower set of ultra violet lights turned on. The sheet is cast in this manner using 1/8″ gasketing around the edge so as to yield a 1/8″ sheet. After the pouring is complete the top lights are lowered and the sheet left under the lights for 1 hour. The sheet is then removed from the lights with the glass plate and placed in an oven at 180° F. for 2 hours until the sheet is hard and cured. The design is completely uniform and exhibits a high degree of pearly orientation.

*Example 2*

To 100 parts of methyl methacrylate monomer were added .01 part of benzoyl peroxide. This mixture was heated at 90° C. until a syrup of 1,000 cps. viscosity formed (about 1–2 hours). The syrup was then cooled down and the following formulation made up:

| | Parts |
|---|---|
| Methyl methacrylate syrup | 100 |
| Nacromer XTX [1] | 2 |
| Benzoin | .3 |
| Lauryl peroxide | .6 |

[1] Pearl pigment—Mearl Corp.

The formulation was introduced onto a horizontal glass plate having a gasket 1/16″ thick around its perimeter.

The ultra violet lights were turned on the bottom and a brush used to impart a streaking design to the liquid. The top lights were turned on and the sheet was left under the lights for 3 hours until it was hard and cured. The final sheet was pearly and showed a completely uniform "brush pattern."

After the sheets are cured they may be removed from the glass plate and cut or shaped for any of a number of applications such as: decorative tile, furniture tops, jewelry inserts, decorative boxes and cases, decorative paneling, room dividers, etc. The material may be laminated to other surfaces or used by itself.

The advantages of this invention will be apparent to those skilled in the art. An improved, efficient, economical process is provided for preparing articles of great utility.

It is to be understood that this invention is not limited to the specific examples which have been offered merely as illustrations and that modifications may be made without departing from the spirit of the invention.

What is claimed is:

1. A process for preparing a cast synthetic pearlescent plastic sheet composition having a fixed lamellae crystal orientation pattern which comprises putting down a liquid pearlescent resin of an organic compound adapted to give a polymer solid under the influence of ultra violet light, and having a viscosity range of about 5 to 2,000 poises at room temperature in an open plate to form an ordered design, the viscosity of the liquid resin being such as to maintain the design and treating the liquid resin with the ordered design with ultra violet light to polymerize the resin to a solid, until a sheet having the fixed lamellae crystal orientation is obtained, the ultra violet light treatment being uniform in nature so as to fix the ordered design in the sheet.

2. The process of claim 1 in which the ultra-violet light treatment is conducted for a time in the range of about 1/2 to 3 hours.

3. The process of claim 1 in which the ultra violet treated sheet is then subjected to a heat treatment.

4. The process of claim 1 in which the resin sheet being treated is a polyester resin.

5. The process of claim 1 in which the resin being treated is a methyl methacrylate resin.

References Cited in the file of this patent

UNITED STATES PATENTS

| 2,385,687 | Carnahan | Sept. 25, 1945 |
| 2,480,749 | Marks | Aug. 30, 1949 |
| 2,480,751 | Marks | Aug. 30, 1949 |
| 2,480,752 | Rogers | Aug. 30, 1949 |
| 2,516,065 | McElligott | July 18, 1950 |
| 2,648,098 | McElligott | Aug. 11, 1953 |
| 2,774,992 | McElligott | Dec. 25, 1956 |